(12) United States Patent
Turner

(10) Patent No.: US 8,700,731 B2
(45) Date of Patent: Apr. 15, 2014

(54) SYSTEM AND METHOD FOR AGGREGATING AND PROVIDING AUDIO AND VISUAL PRESENTATIONS VIA A COMPUTER NETWORK

(75) Inventor: Tod C. Turner, Kenmore, WA (US)

(73) Assignee: LINQware, Inc., Kenmore, WA (US)

( * ) Notice: Subject to any disclaimer, the term of this patent is extended or adjusted under 35 U.S.C. 154(b) by 634 days.

(21) Appl. No.: 12/545,125

(22) Filed: Aug. 21, 2009

(65) Prior Publication Data

US 2010/0049827 A1 Feb. 25, 2010

Related U.S. Application Data

(60) Provisional application No. 61/090,680, filed on Aug. 21, 2008, provisional application No. 61/090,673, filed on Aug. 21, 2008, provisional application No. 61/090,678, filed on Aug. 21, 2008, provisional application No. 61/090,688, filed on Aug. 21, 2008, provisional application No. 61/090,681, filed on Aug. 21, 2008, provisional application No. 61/090,684, filed on Aug. 21, 2008, provisional application No. 61/090,672, filed on Aug. 21, 2008.

(51) Int. Cl.
| | |
|---|---|
| G06F 15/16 | (2006.01) |
| G06F 17/00 | (2006.01) |
| G06F 3/00 | (2006.01) |
| H04N 7/14 | (2006.01) |
| H04N 3/00 | (2006.01) |
| H04N 5/228 | (2006.01) |
| G03B 13/00 | (2006.01) |

(52) U.S. Cl.
USPC ........... 709/217; 709/203; 709/204; 709/205; 709/230; 709/231; 715/202; 715/716; 715/719; 715/720; 715/723; 348/14.01; 348/14.08; 348/326; 348/328; 348/349

(58) Field of Classification Search
USPC .......... 709/203–205, 217, 230, 231; 715/201, 715/202, 716, 719–723; 348/14.01, 14.08, 348/326, 328, 349
See application file for complete search history.

(56) References Cited

U.S. PATENT DOCUMENTS

| | | | | |
|---|---|---|---|---|
| 5,767,897 | A  * | 6/1998 | Howell | 348/14.07 |
| 6,349,303 | B1 * | 2/2002 | Saito | 1/1 |
| 2004/0239754 | A1 * | 12/2004 | Shachar et al. | 348/14.08 |
| 2005/0066047 | A1 * | 3/2005 | Miyake et al. | 709/231 |
| 2006/0200520 | A1 * | 9/2006 | Vernon et al. | 709/204 |
| 2007/0078931 | A1 * | 4/2007 | Ludwig et al. | 709/204 |
| 2009/0125582 | A1 * | 5/2009 | Marcus | 709/203 |
| 2010/0034201 | A1 * | 2/2010 | Barave et al. | 370/389 |

* cited by examiner

*Primary Examiner* — David Lazaro
*Assistant Examiner* — Farzana Huq
(74) *Attorney, Agent, or Firm* — Cozen O'Connor; Louis Heidelberger

(57) ABSTRACT

A method for providing content via a computer network and computing device, which may include: storing data associated with and indicative of a plurality of presentations; receiving a request to host an audio presentation; receiving and storing data associated with the requested audio presentation; initiating and recording one or more telephone calls; and, presenting at least a portion of the stored data for selection by the computing device; wherein, selection causes the stored data indicative of the selected audio/visual or audio presentation to be provided to the computing device for playback thereby via the computer network. The method may include storing data associated with and indicative of a first plurality of presentations; storing data associated with a plurality of second presentation feeds: automatically and periodically accessing each of the feeds; and aggregating each of the presentations for delivery via the computer network.

11 Claims, 8 Drawing Sheets

*Fig. 3*

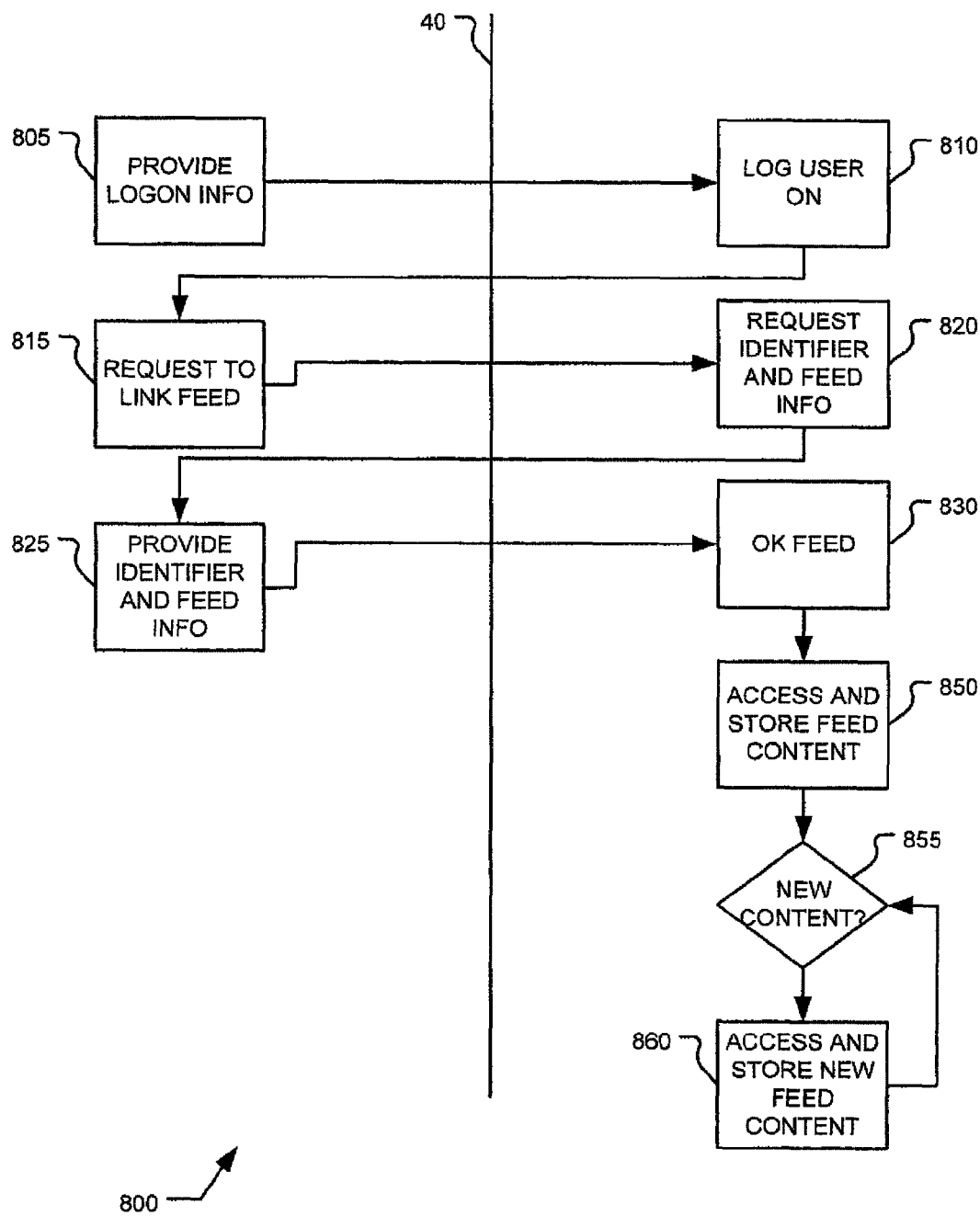

SYSTEM AND METHOD FOR AGGREGATING AND PROVIDING AUDIO AND VISUAL PRESENTATIONS VIA A COMPUTER NETWORK

RELATED APPLICATIONS

This application claims priority of U.S. patent application Ser. Nos. 61/090,673 entitled: CONTENT, TRAFFIC AND ADVERTISING ENGINE, SYSTEM AND METHOD; 61/090,680 entitled: SYSTEM AND METHOD FOR AGGREGATING AND PROVIDING AUDIO AND VISUAL PRESENTATIONS VIA A COMPUTER NETWORK; 61/090,678 entitled: CONTENT, TRAFFIC AND ADVERTISING ENGINE, SYSTEM AND METHOD; 61/090,688 entitled: SYSTEM AND METHOD OF VALIDATING CONTENT, TRAFFIC AND ADVERTISING IN A COMPUTING APPLICATION AND ENGINE; 61/090,681 entitled: DYNAMIC READ THROUGH DATA COLLECTION AND AD DELIVERY SYSTEM AND METHOD OF SAME; 61/090,684 entitled: SYSTEM AND METHOD FOR TRAFFIC IN A CONTENT AND ADVERTISING ENGINE; and 61/090,672 entitled: System and Method for Providing and Tracking the Provision of Audio and Visual Presentations via a Computer Network, all having common inventor Tod C. Turner; and each of which is incorporated herein by reference as if set forth in its respective entirety herein.

FIELD OF THE INVENTION

The present invention relates generally to the provision of information, and more particularly to the provision of informational, entertainment, educational, business and other audio and/or audio/visual presentations via a computer network.

BACKGROUND OF THE INVENTION

The Internet is a global network connecting millions of computers and linking users in more than 100 countries into exchanges of data, news and opinions. Unlike online services, which are centrally controlled, the Internet is decentralized. Each Internet enabled computer is independent, such that its user can choose which Internet services to use and which local services to make available to the global Internet community.

There are many types of content available via the Internet, including textual content, graphical content, audio content and video content. The amount of content available via the Internet is virtually unlimited. Accordingly, it can prove difficult for a user of an Internet enabled computer to identify and locate content of a particular type and relating to a particular subject.

A popular solution to finding desired content is to use a publicly available search engine. A search engine searches documents for specified keywords and returns a list of documents where the keywords were found. Typically, a search engine utilizes a webcrawler to provide documents. An indexer then typically reads the webcrawler provided documents and creates an index based on the words contained in each document. Each search engine typically uses its own methodology to create indices such that, ideally, only meaningful results are returned for each query. This is not always true though due to the complex nature and nuances of human language and efforts by document authors or providers to fool or trick the indexer into ranking its documents above those of others. Examples of conventional search engines include those made available via www.yahoo.com, www.google.com and www.search.com, all by way of non-limiting example only.

Accordingly, there is a need for a system and method of using the Internet as a global network to unite people with common interests. Such a system and method may be used as productivity tools for business, and to educate and entertain consumers.

SUMMARY OF THE PREFERRED EMBODIMENTS

A method for providing content via a computer network and computing device, the method including: storing data associated with a plurality of audio/visual presentations; storing data indicative of the plurality of audio/visual presentations so as to be associated with the stored data associated with the plurality of audio/visual presentations; receiving a request to host an audio presentation via the computer network from the computing device; receiving data associated with the requested audio presentation via the computer network from the computing device; storing the received data associated with the requested audio presentation; initiating a telephone call independent of the computing device dependently upon the stored data associated with the requested audio presentation: recording the telephone calls; storing data indicative of the recorded telephone call so as to be associated with the stored data associated with the requested audio presentation; and, presenting at least a portion of the stored data associated with the audio/visual presentations and audio presentation for selection by the computing device; wherein, selection of the audio/visual and audio presentation associated data causes the stored data indicative of the selected audio/visual or audio presentation to be provided to the computing device for playback thereby via the computer network.

A method for providing content via a computer network and computing system, the method including: storing data associated with a first plurality of presentations using the computer system; storing data indicative of the first plurality of presentations so as to be associated with the stored data associated with the first plurality of presentations using the computer system; storing data associated with a plurality of feeds using the computer system, wherein each of the feeds provides a corresponding second plurality of presentations being accessible via the computer network, and no data indicative of the second plurality of presentations is stored using the computing system; automatically and periodically accessing each of the feeds to identify each of the provided second plurality of presentations, using the computer system; and aggregating each of the first and identified second pluralities of presentations for delivery via the computer network using a common web page.

A computer program product being embodied in at least one computer readable medium and for providing content from a computer system via a computer network to a computer device, the product including: code for storing data associated with a first plurality of presentations using the computer system; code for storing data indicative of the first plurality of presentations so as to be associated with the stored data associated with the first plurality of presentations using the computer system; code for storing data associated with a plurality of feeds using the computer system, wherein each of the feeds provides a corresponding second plurality of presentations being accessible via the computer network, and no data indicative of the second plurality of presentations is stored using the computer system; code for automatically and periodically accessing each of the feeds to identify each of the provided second plurality of presentations, using the computer system; code for storing data associated with a third plurality of presentations, wherein data indicative of the third plurality of presentations is not stored using the computer system; and code for aggregating each of the first, identified second and third pluralities of presentations for delivery via the computer network using a common web page.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts:

FIG. 3 illustrates an electronic document according to an embodiment of the present invention;

FIG. 8 illustrates a flow diagram of a process according to an embodiment of the present invention.

DETAILED DESCRIPTION OF THE PREFERRED EMBODIMENTS

Figure 1:
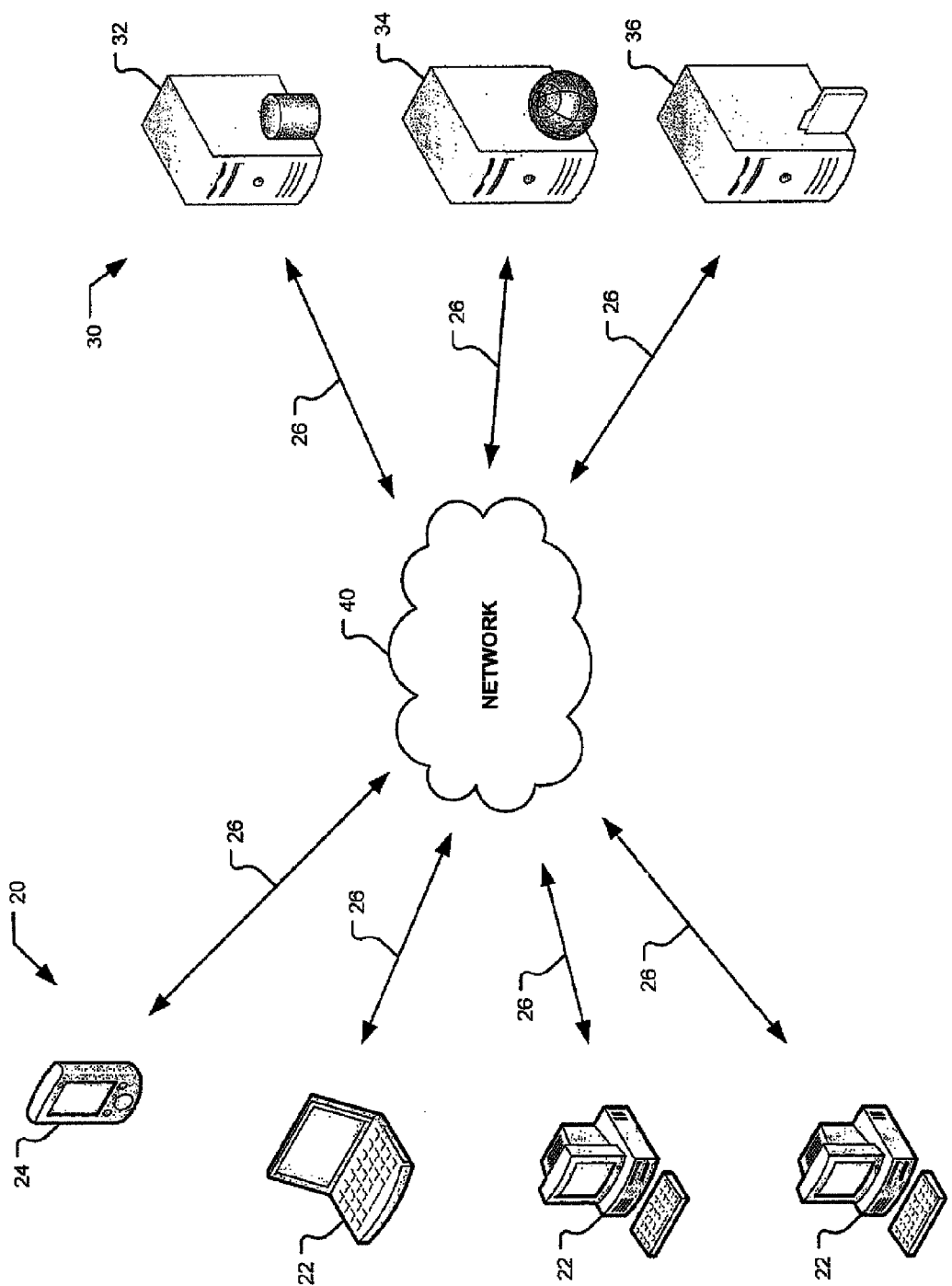
FIG. 1 illustrates a block diagram of a system of networked computers.

It is to be understood that the figures and descriptions of embodiments of the present invention have been simplified to illustrate elements that are relevant for a clear understanding of the present invention, while eliminating, for the purpose of clarity, many other elements found in typical website and audio/visual content delivery systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

For non-limiting purposes of explanation only, "computer," as referred to herein, refers to a general purpose computing device that includes a processor. "Processor," as used herein, refers generally to a device including a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory," as used herein, refers to one or more devices capable of storing data, such as in the form of chips, or other medium like magnetic or optical discs. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. Memory may be internal or external to an integrated unit including the processor. Memory may be internal or external to the computer. Such memory may store a computer program, e.g., code or a sequence of instructions being operable by the processor. Such a computer may include one or more data inputs. Such a computer may include one or more data outputs. The code stored in memory may cause the processor, when executed by the processor, to set an output to a value responsively to a sensed input.

One type of computer executable code typically stored in memory so as to be executable by an Internet enabled computer is a browser application. For non-limiting purposes of explanation only, "browser application" or "browser," as used herein, generally refers to computer executable code used to locate and display web pages. Commercially available browsers are Microsoft Internet Explorer, Netscape Navigator, Apple Safari, Google Chrome and Firefox, which all support text, graphics and multimedia information, including sound and video (sometimes through browser plug-in applications). "Plug-in," as used herein, generally refers to computer executable code that adds a specific feature or service to a larger system, in the case of a browser plug-in, the browser application.

The terms "computer," "computer device" and/or "computer system" as used herein may generally take the form of single computing devices or collections of computing devices having a common operator or under common control.

According to certain embodiments of the present invention, content may be aggregated for presentation to users. According to certain embodiments of the present invention, audio content may be aggregated for presentation to users. According to certain embodiments of the present invention, video content may be aggregated for presentation to users. According to certain embodiments of the present invention, audio and video content may be aggregated for presentation to users.

Referring now to FIG. 1, there is shown a block diagram of a system of networked computers 10. The illustrated system 10 includes a plurality of user computers 20, a plurality of network server computers 30 and a network 40 interconnecting computers 20, 30 together.

Illustrated system 10 includes personal computing devices 22 and a personal digital assistant computer/web-enabled cell phone computer 24 by way of non-limiting example only. Communication links 26 communicatively couple devices 20 with network 40. Links 26 may take the form of wired and/or wireless communications links, including fiber optic, POTS, DSL, cable and/or multiple access or GSM based wireless telephony or data communications systems, for example. Network 40 may include portions of proprietary and service provider networks, as well as the Internet, for example. Illustrated system 10 includes a database server 32, a content or web server 34 and a file server 36, all by way of non-limiting example only. Communication links 26 communicatively couple devices 30 with network 40 as well. "Server", as used herein, generally refers to a computing device communicatively coupled to a network and that manages network resources. A server may refer to a discrete computing device, or may refer to an application that is managing resources rather than the entire computing device.

Figure 2:
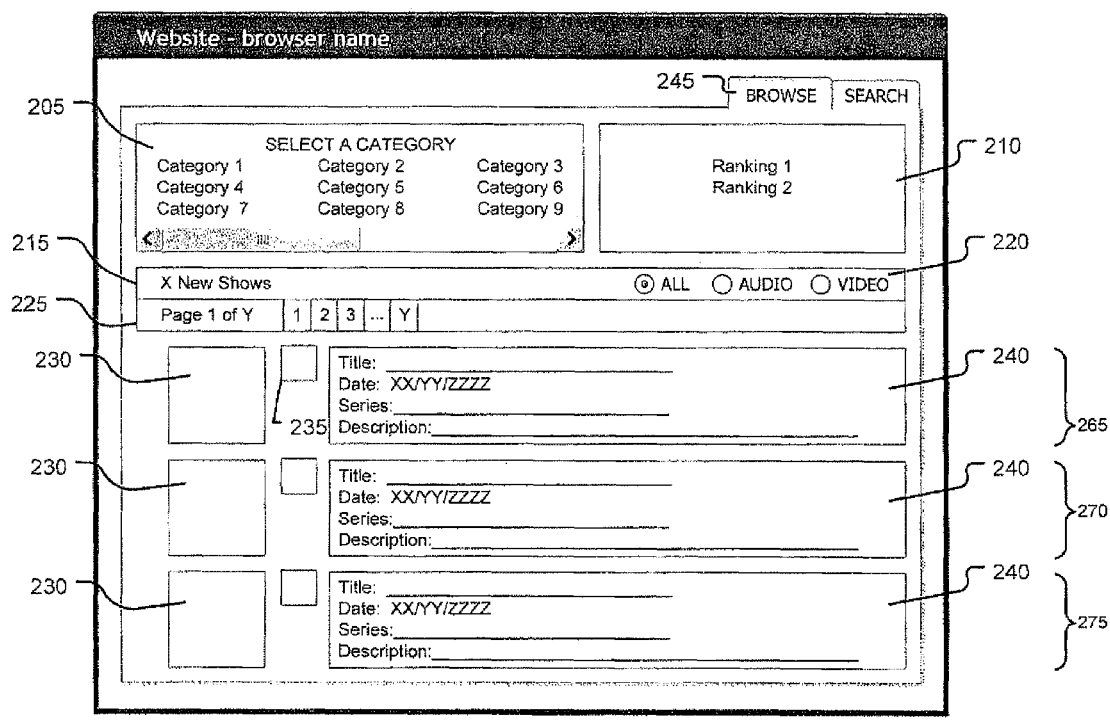
FIG. 2 illustrates an electronic document according to an embodiment of the present invention.

Referring now also to FIG. 2, there is illustrated a web page 200 according to an embodiment of the present invention. Web page 200 may be provided to computers 20 by computers 30 via network 40. Illustrated web page 200 aggregates audio and/or video content for presentation to users of computers 20.

Referring still to FIG. 2, the particularly illustrated web page 200 includes a category selector 205, a ranking selector 210, a new content indicator 215, a content type indicator 220, a page selector 225, particular content graphics 230, particular content type indicators 235 and particular content information 240 organized under a browser tab 245. Web page 200 may take other forms and/or different content as is conventionally achieved in the pertinent arts.

Particular content graphics 230, particular content type indicators 235 and particular content information 240 are organized to indicate individual presentations. In the illustrated embodiment, presentations 265, 270, 275, are respectively shown. A user may select such a presentation for display by selecting an individual presentation for streaming or downloading, such as by clicking on an indicator 235, 240 or 245. For non-limiting purposes of explanation, "streaming," as used herein, generally refers to a technique for transferring data such that it can be processed as a substantially steady or continuous stream and a user's browser or plug-in can start presenting the data before the entire file has been transmitted. For non-limiting purposes of explanation, "downloading," as used herein, generally refers to a technique for transmitting data (e.g., an entire data file) between computers, such as between file server 36 (FIG. 1) and a computing device 22 (FIG. 1). In certain embodiments of the present invention, a commercially available content (e.g., audio and/or video podcast) delivery application, such as the Flash product available from Adobe Systems Inc., may be used to provide selected presentations to users' computers 20 (FIG. 1).

Referring still to FIGS. 1 and 2, a user of a device 20 may request page 200 from content server 34 using a browser application in a conventional manner Server 34 may provide page 200 to the requesting computer 20 in a conventional manner, optionally using database server 32 to populate page 200, for example.

In certain embodiments of the present invention, when a user selects a category in selector 205, content server 34 may request database server 32 identify which presentations should be used to populate page 200 according to the selected category. Server 34 may then provide such a populated page 200 to the requesting user computer 20 Examples of categories that may be included and selected using selector 205 include art, autos and vehicles, bloggers and people, celebrity gossip, comedy, education, gadgets, health, how to and DIY, legal, music, news, and pets and animals, for example. By selecting one of these categories, a user may receive pages 200 populated with content according to the selected category.

In certain embodiments of the present invention, when a user selects a ranking in indicator 210, content server 34 may request database server 32 identify which presentations should be used to populate page 200 according to the selected ranking. Server 34 may then provide such a populated page 200 to the requesting user computer 20. Examples of rankings that may be included and selected using indicator 210 include most recent presentations and most popular presentations, for example. By selecting one of these rankings, a user may receive pages 200 populated with content according to the selected ranking.

In certain embodiments of the present invention, a user may select a populated presentation (e.g., 265, 270 or 275, FIG. 2). In response thereto, server 34 may request file server 36 either stream or download the selected presentation to the requesting user's computer 20, such as via a web page 200 in a conventional manner.

Figure 3:
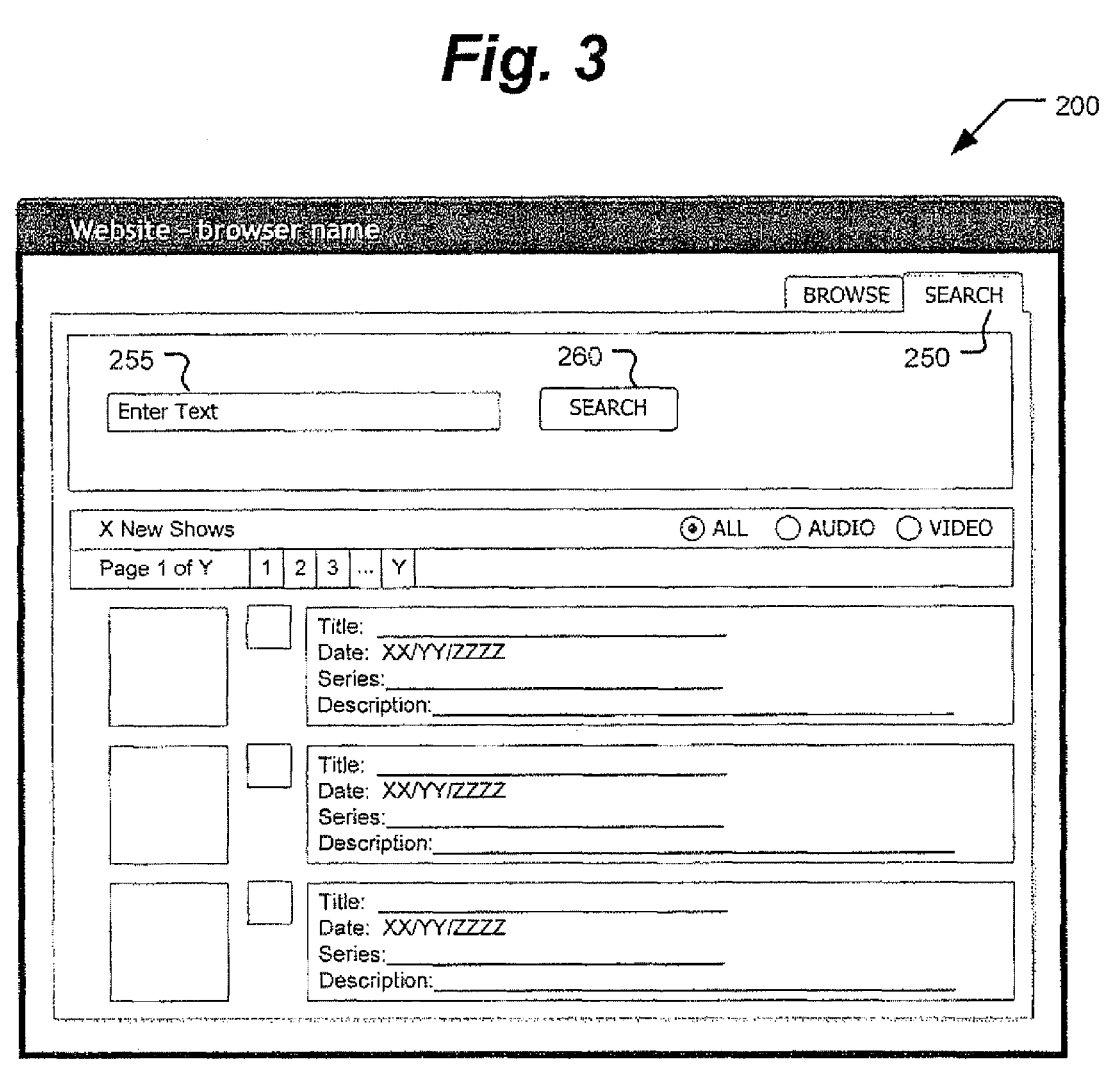

Referring now to FIG. 3, there is shown a view of web page 200 when tab 250 is selected. In the illustrated embodiment of FIG. 3, web page 200 includes a text box 255 and search button 260 under tab 250. In certain embodiments of the present invention, when tab 250 is selected, text box 255 and search button 260 may be presented on the user's computer 20 by server 34. A user may enter a search term into window 255 in a conventional manner. A user may then activate search button 260 in a conventional manner. Responsively thereto, content server 34 may request database server 32 identify which presentations should be used to populate page 200 according to the entered search term(s). Server 34 may then provide such a populated page 200 to the requesting user computer 20.

As will be appreciated by those possessing an ordinary skill in the pertinent arts, there are a number of ways to aggregate and provide content using web page 200.

In certain embodiments of the present invention, users may be permitted to directly upload and enter information regarding content, e.g., to file server 36 (FIG. 1). In certain embodiments of the present invention, users may be permitted to link presentations housed elsewhere in memory so as to be accessible to a computer 20 (FIG. 1) via network 40 (FIG. 1)—essentially registering them with database server 32 (FIG. 1). In certain embodiments of the present invention, presentations may be created using computers 20, 30. And, in certain embodiments of the present invention, presentations housed elsewhere in memory so as to be accessible to a computer 20 (FIG. 1) via network 40 (FIG. 1) may be automatically linked to—essentially registering them with database server 32 (FIG. 1).

Figure 4:
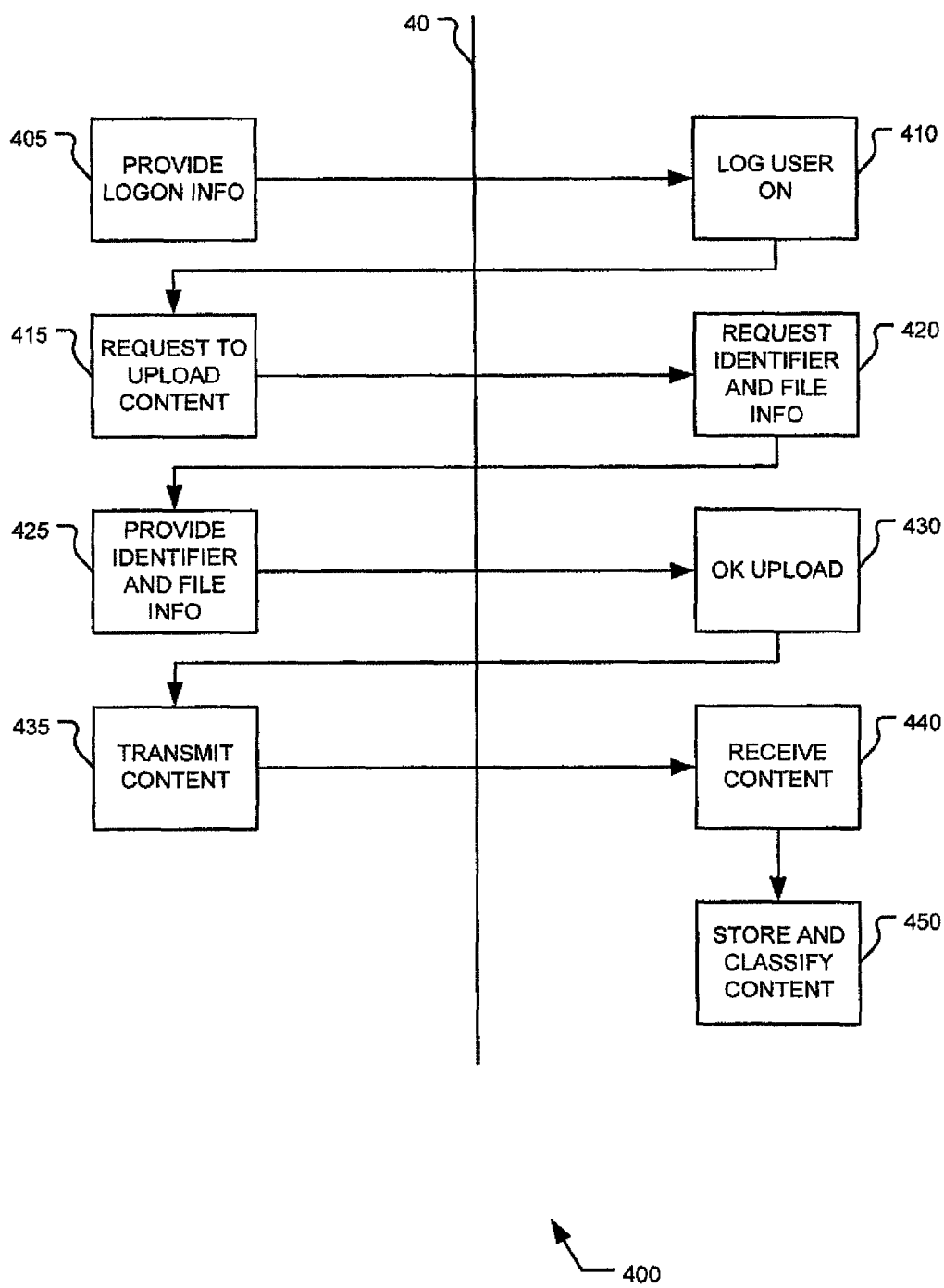
FIG. 4 illustrates a flow diagram of a process according to an embodiment of the present invention.

Referring now also to FIG. 4, there is shown a flow diagram of a process 400 according to an embodiment of the present invention. Process 400 is suitable for permitting users to directly upload and enter information regarding content. Process 400 commences with a user providing log on information using a computer 20 at block 405, which is provided to computers 30 via network 40, in certain embodiments to server 34. Computers 30 log the user on at block 410, and communicates this status to the user via network 40, in certain embodiments by serving a page 200 (FIGS. 2, 3) to the logged on user's computer 20.

At block 415, the logged on user requests to upload content, e.g., by interacting in a conventional manner with web page 200. This request is provided to computers 30 via network 40. At block 420, computers 30 request information regarding the content to be uploaded. In certain embodiments, the requested information may include a content title, date, series information and description, akin to that to be displayed in a corresponding indicator 240 (FIGS. 2, 3). The request may further include a file identifier and location of the content indicative file to ultimately be uploaded. This request may be communicated to the user's computer 20 via network 40.

At block 425, the user provides at least a portion of the requested information, which is communicated to computers 30 via network 40. Some or all of the information provided may be screened or filtered or verified in conventional manners at block 430. In certain embodiments of the present invention, information provided at block 425 may be received and screened or filtered or verified at block 430 using web server 34. All or a portion of that information may then be stored using database server 32, for later use in populating web pages 200, for example.

At block 430, computers 30 indicate the received information is suitable for use and confirms the content may be uploaded. This indication is provided to the user's computer 20 via network 40. At block 435, the user's computer transmits the content to computers 30 via network 40, e.g., performs a file upload in a conventional manner. The content is received by computers 30 at block 440. In certain embodiments of the present invention, content transmitted and received at blocks 435, 440 may take the form of media file suitable for use as a podcast, for example. Such a file may be received by server 34 for example, and provided to server 36 for storage 450 and later retrieval for downloading and/or streaming pursuant to a user's interaction with webpage 200 (FIGS., 2, 3), for example. In such a case, server 32 may associate the stored content indicative information provided at block 425 with the file stored at block 450.

Figure 5:
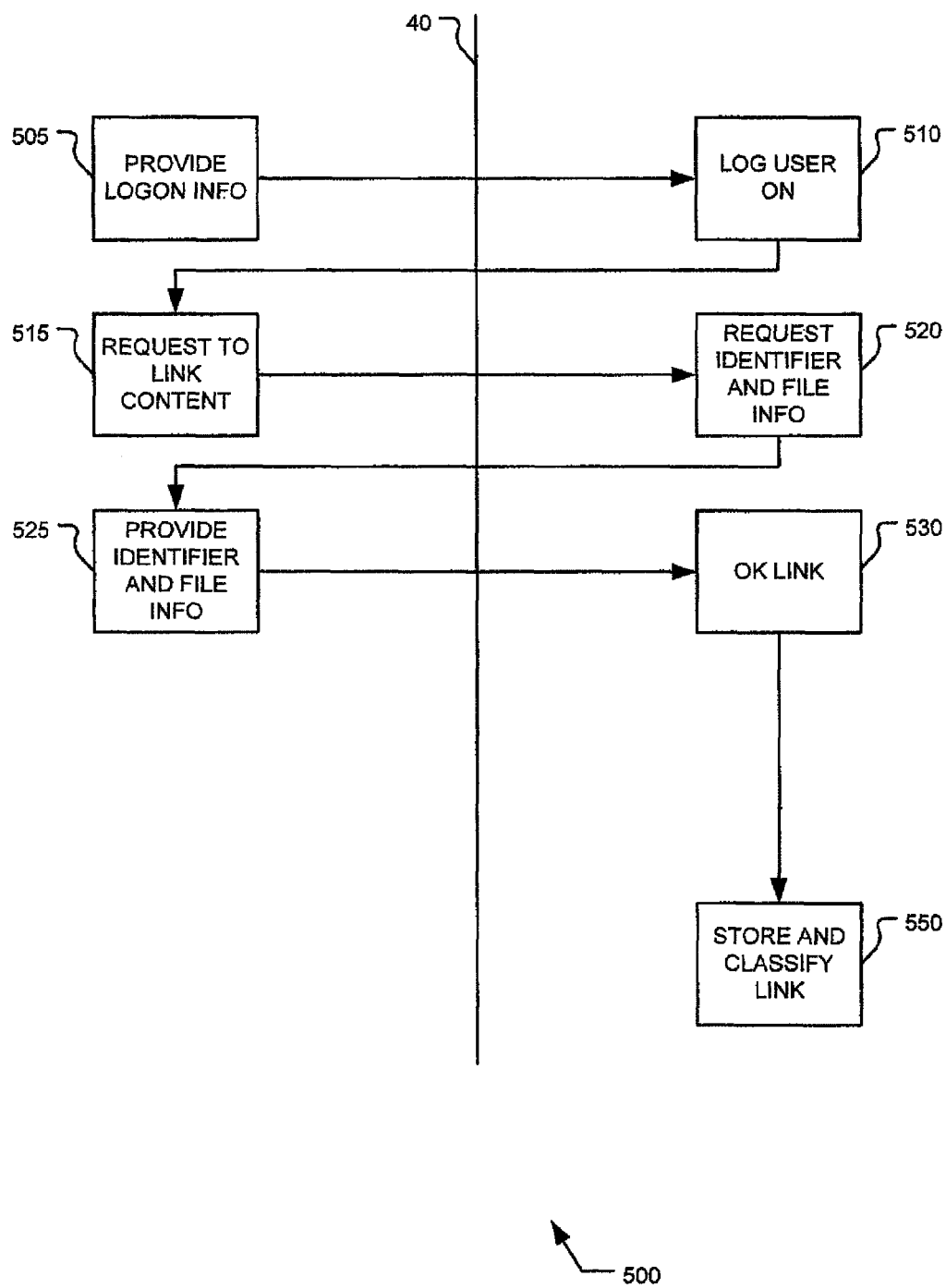
FIG. 5 illustrates a flow diagram of a process according to an embodiment of the present invention.

Referring now also to FIG. 5, there is shown a flow diagram of a process 500 according to an embodiment of the present invention. Process 500 is suitable for permitting users to link presentations housed elsewhere in memory so as to be accessible to a computer 20 via network 40.

Process 500 commences with a user providing log on information using a computer 20 at block 505, which is provided to computers 30 via network 40, in certain embodiments to server 34. Computers 30 log the user on at block 510, and communicate this status to the user via network 40, in certain embodiments by serving a page 200 (FIGS. 2, 3) to the logged on user's computer 20.

At block 515, the logged on user requests to link or register content, e.g., by interacting in a conventional manner with web page 200. This request is provided to computers 30 via network 40. At block 520, computers 30 request information regarding the content to be linked. In certain embodiments, the requested information may include a content title, date, series information and description, akin to that displayed in a corresponding indicator 240 (FIGS. 2, 3). The request may further include a file identifier and location of the content indicative file to be linked. This request may be communicated to the user's computer 20 via network 40.

At block 525, the user provides at least a portion of the requested information, which is communicated to computers 30 via network 40. Some or all of the information provided may be screened or filtered or verified in conventional manners at block 530. In certain embodiments of the present invention, information provided at block 525 may be received and screened or filtered or verified at block 530 using web server 34. In certain embodiments of the present invention, the file location data (e.g., an Internet address at which the file is available) may be checked to see if a valid media file is located thereat. All or a portion of that information may then be stored using database server 32, for later use in populating web pages 200, for example.

At block 530, computers 30 indicate the received information is suitable for use and confirms the content may be linked. At block 550 the received information may be stored using server 32 for later retrieval and use. Server 32 may also associate the linked content indicative information provided at block 525 with the file address stored at block 550.

Certain embodiments of the present invention may provide the ability to track the number of visitors to the platform of the present invention, and additionally the number of visitors per content via the platform of the present invention. Further, the number of pages viewed by each visitor may additionally be tracked, such as in a tabular format, and such information may be continuously updated for as long as a user remains on a given page, that is, for as long as a user continues to watch a particular show. For example, it may be determined when a user begins and ends listening to and/or watching a presentation, e.g., a podcast, for example. Where a selected presentation is streamed from computers 30, such an inquiry may be relatively simple, by confirming the content streaming is progressing as expected, for example. Where content is housed elsewhere and linked to by computers 30, such a direct inquiry may not be readily available though. Tracking may be performed, for example, via entry into one or more tables of database server 32 of timed data. At each expiration of a timer, such as every 15 seconds, a table entry may be made corresponding to the user, the page the user is on, and, to the extent the user is on the same page as was the user upon the last expiration of the timer, the user's total time, to the current time, spent on that same page. The user may be identified by, for example, any of a number of known methodologies, such as the information the user used to login, the user's IP address, the user's response to an identifying query, or the like.

Thus, certain embodiments of the present invention provide a capability to know that a viewer began viewing a particular show at a certain time, and when a user began viewing a different page, or show, thereby providing knowledge of how long a particular viewer spent on a particular page. Such knowledge is not conventionally available, and the provision of such knowledge by certain embodiments of the present invention allows for an increasing scale of payments for advertising displayed on a given page correspondent to how long a viewer or viewers remain, or typically remain, on that particular page or like pages. Thus, a tabular tracking of the present invention allows for the knowledge of how long a viewer spends on a page, what the viewer was viewing or listening to on the given page, the ads shown while the viewer was viewing or listening, how long the ads were shown, and what ads were shown to the view correspondent to that viewer's identification and/or login.

Figure 6:
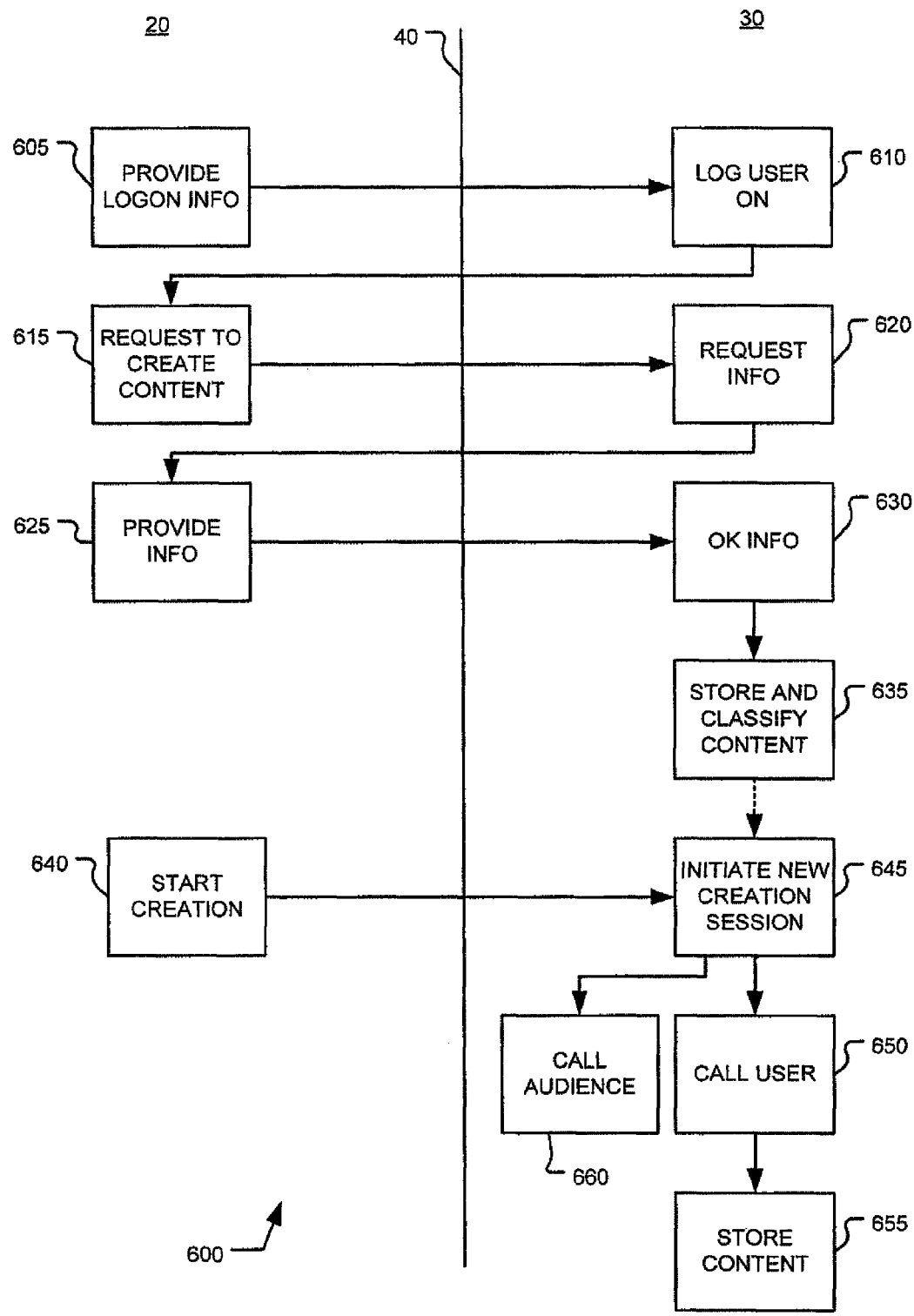
FIG. 6 illustrates a flow diagram of a process according to an embodiment of the present invention.

Referring now also to FIG. 6, there is shown a flow diagram of a process 600 according to an embodiment of the present invention. Process 600 is suitable for permitting users to create presentations, such as by hosting an audio show that may be recorded to create a podcast, using computers 20, 30.

Process 600 commences with a user providing log on information using a computer 20 at block 605, which is provided to computers 30 via network 40, in certain embodiments to server 34. Computers 30 log the user on at block 610, and communicate this status to the user via network 40, in certain embodiments by serving a page 200 (FIGS. 2, 3) to the logged on user's computer 20.

At block 615, the logged on user requests to create content or host a show, e.g., by interacting in a conventional manner with web page 200. This request is provided to computers 30 via network 40. At block 620, computers 30 request information regarding the content to be created. In certain embodiments, the requested information may include a content title, date, series information and description, akin to that displayed in a corresponding indicator 240 (FIGS. 2, 3). The request may further include a phone number at which the user may be reached. This request may be communicated to the user's computer 20 via network 40.

At block 625, the user provides at least a portion of the requested information, which is communicated to computers 30 via network 40. Some or all of the information provided may be screened or filtered or verified in conventional manners at block 630. In certain embodiments of the present invention, information provided at block 625 may be received and screened or filtered or verified at block 630 using web server 34. In certain embodiments of the present invention, the user's phone number may be checked to see if it is valid. All or a portion of that information may then be stored at block 635 using database server 32, for later use in populating web pages 200, for example.

At block 640, the requesting user indicates he would like to begin creating the presentation, e.g., by interacting in a conventional manner with web page 200. This indication is communicated to computers 30 via network 40. At block 645 computers 30 initiate a new presentation creation session. At block 650, a voice communications session between computers 30 and the user is commenced. In certain embodiments of the present invention, a telephone call may be automatically placed by computers 30 at block 650 to the phone number indicated at block 625.

Figure 7:
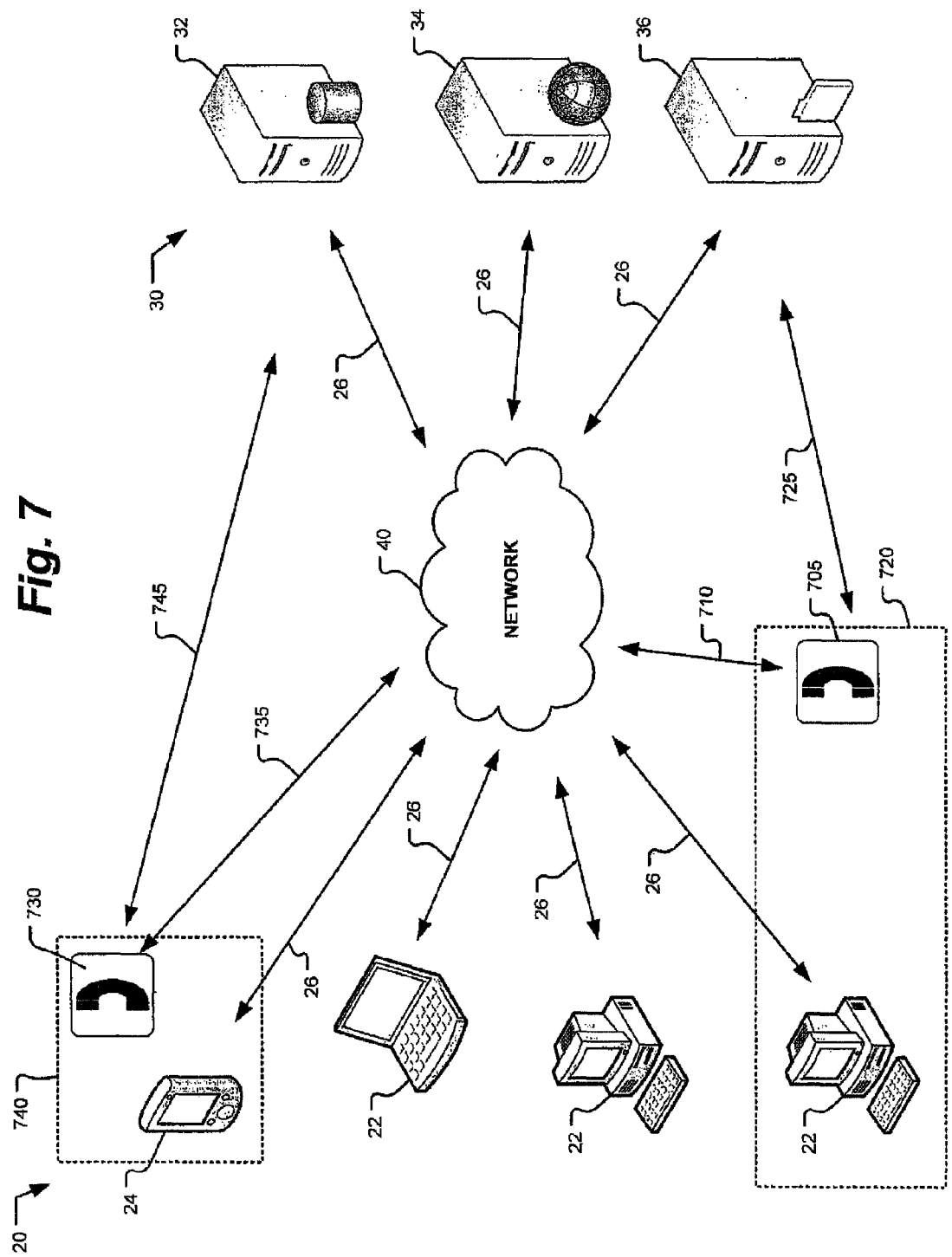
FIG. 7 illustrates a block diagram of a system of networked computers in conjunction with telecommunications devices according to an embodiment of the present invention.

Referring now to FIG. 7, there is shown a block diagram of a system of networked computers and telephones 700. Like system 10, illustrated system 700 includes personal computing devices 22 and a personal digital assistant/web-enabled cellular phone computer 24 by way of non-limiting example only. Communication links 26 communicatively couple devices 20 with network 40. Links 26 may take the form of wired and/or wireless communications links, including fiber optic, POTS, OSL, cable and/or multiple access or GSM based wireless telephony or data communications systems, for example. Network 40 may include portions of proprietary and service provider networks, as well as the Internet, for example. Illustrated system 10 includes a database server 32, a content or web server 34 and a file server 36, all by way of non-limiting example only. Communication links 26 communicatively couple devices 30 with network 40 as well.

System 700 additionally includes conventional telephone 705 associated with (as indicated by label 720) a particular computing device 22, e.g., by both corresponding to a given requesting user, for example. In the illustrated embodiment, phone 705 may be communicatively coupled to computers 30 independent of network 40 (e.g., via 725). In the illustrated embodiment, phone 705 may be communicatively coupled to computers 30 via network 40 (e.g., link 710). In certain embodiments of the present invention phone 705 may take the form of a POTS phones. In certain embodiments of the present invention phone 705 may take the form of a VoIP phone. In certain embodiments of the present invention, phone 705 may take the form of a cellular phone. In certain embodiments of the present invention, phone 705 is independent of the associated computer 22. In certain embodiments of the present invention, phone 705 may be communicatively coupled to computers 30 independent of any connection between the associated computer 22 and computers 30.

Referring still to FIGS. 6 and 7, a requesting user may be called at block 650 by computers 30 placing a conventional telephone call to the phone number provided at block 625. Upon the call being answered using phone 705, a pre-recorded audio message indicating the content will be created may be played. Thereafter, the requesting user, or his designee for example, may speak into phone 705, thereby hosting a show, for example. Responsively thereto, computers 30 may digitize the spoken show and store a media file indicative of it (e.g., using file server 36), as indicated at block 655.

Information provided at block 625 and stored at block 635 may include identifications of intended audience members for the presentation, e.g., an audience for the show to be hosted. This additional information may be used at block 660 to initiate analogous telephone calls to those numbers as well. In this way, a phone audience may hear the show live at a plurality of locations. For non-limiting purposes of explanation, this is shown in FIG. 7 as phone 730, which is associated with computer 24 as designated by label 740.

Such a "dial out" functionality allows for an understanding of where the user/viewer/listener can be reached, located, and/or may allow for a myriad additional features in the present invention. For example, a pinpoint geographic location of broadcast listeners may be placed on a map, such as via website 200 to thereby illustrate where other listeners of the broadcast are specifically located. Such a mapping functionality may be realized using a commercially available mapping application, such as Google Maps, for example.

In certain embodiments of the present invention, shows may be streamed analogously as described above as they are being recorded, for example.

It should further be understood such a content generation functionality provides additional advantages. For example, enhanced telephone conferences may be readily achieved according to certain embodiments of the present invention. Such enhanced conferences may exhibit an automatic dial out to conference attendees, including the host and audience. Such enhanced conferences may exhibit automatic recording and archival for later playback as a podcast, for example. Such enhanced functionalities may advantageously be achieved without the host having access to any particular resources other than a general purpose Internet enabled computer and a conventional telephone. Such enhanced functionalities may advantageously be achieved without the any audience member having access to any particular resources other than a conventional telephone. Accordingly, enhanced telephone conferencing may be readily achieved.

In certain embodiments of the present invention, certain portions of aggregated content may have access thereto restricted to authorized members. For example, information provided at blocks 425, 525 and/or 625 may include an authorized group identifier or content password. Such an identifier and/or password may be stored using database server 32. When a user seeks to playback such protected content, e.g., by interacting with web page 200 as set forth above, the user may need to log in (e.g., analogously to log in at blocks 405, 410, 505, 510, 605, 610) or provide the corresponding password. Where a group identifier is used, database server 32 may indicate what groups a logged in user is authorized for, so as to selectively permit access to protected content to authorized users. Such groups may, by way of non-limiting example only, include businesses and other private organizations.

Referring now also to FIG. 8, there is shown a flow diagram of a process 800 according to an embodiment of the present invention. Process 800 is suitable for automatically aggregating and linking to presentations housed elsewhere in memory so as to be accessible to a computer 20 (FIG. 1) via network 40 (FIG. 1)—essentially registering them with database server 32 (FIG. 1).

Syndication of Internet content is becoming more commonplace. Really Simple Syndication ("RSS") is a family of Internet feed formats used to publish content that may be frequently updated, such as podcasts (RSS 2.0). RSS utilizes a standardized format. An RSS document (sometimes referred to as a "feed," "web feed" or "channel") typically contains either a summary of content from an associated web site or the full text.

An RSS may itself be used to aggregate content from multiple web sources in one place. RSS content is typically accessed using an RSS reader application. Such an application may be a thin, web-page based application or a downloaded application executed on a user's computer (e.g., 20, FIG. 1). RSS feeds may typically be subscribed to by entering or selecting the feed's link using the reader. The RSS reader typically checks the user's subscribed feeds for new content at predetermined intervals, downloads updates, and provides a user interface to monitor and view the feeds.

Embodiments of the present invention will be discussed with regard to RSS 2.0 feeds for non-limiting purposes of explanation only. It should be recognized that embodiments of the present invention may be suitable for use with other types of content (e.g., audio/video) feeds.

Referring again to FIG. 8, process 800 commences with a user providing log on information using a computer 20 at block 805, which is provided to computers 30 via network 40, in certain embodiments to server 34. Computers 30 log the user on at block 810, and communicate this status to the user via network 40, in certain embodiments by serving a page 200 (FIGS. 2, 3) to the logged on user's computer 20.

At block 815, the logged on user requests to link an RSS feed, e.g., by interacting in a conventional manner with web page 200. This request is provided to computers 30 via network 40. At block 820, computers 30 request information regarding the content to be created. In certain embodiments, the requested information may include a content title, series information and description, akin to that displayed in a corresponding indicator 240 (FIGS. 2, 3). The request may further include RSS feed identification and/or access information through which the feed may be accessed. This request may be communicated to the user's computer 20 via network 40.

At block 825, the user provides at least a portion of the requested information, which is communicated to computers 30 via network 40. Some or all of the information provided may be screened or filtered or verified in conventional manners at block 830. In certain embodiments of the present invention, information provided at block 825 may be received and screened or filtered or verified at block 830 using web server 34. In certain embodiments of the present invention, the feed identifier and/or access information may be checked to see if it is valid. All or a portion of that information may then be stored at block 850 using database server 32, for later use in populating web pages 200, for example. At block 850, the feed may further be accessed to acquire information regarding and/or either links to or the feed content itself then present. All of this information may be automatically aggregated using computers 30 in accordance with the methods described herein-above with regard to FIGS. 4 and/or 5, where the feed information (e.g., RSS associated XML data) is used in lieu of user provided information. The date and time when content is automatically acquired via such a registered RSS feed may also be stored at block 850 using computers 30, e.g., database server 32.

At block 855, computers 30 may determine if new content exists for one or more feeds stored at block 850. This may be accomplished in any of a number of conventional manner, including periodically checking when the feed was last updated and/or the content available there-through to data stored at block 850. When new of changed content is found, the data stored at block 855 may be appended or amended to reflect the new content.

It should further be understood such a content acquisition provides additional advantages. For example, each user wishing to identify and view content available via an RSS feed may conventionally need to obtain and operate an RSS reader application. Further, each such RSS reader application would need to access each identified RSS feed. This leads to substantial bandwidth usage, for example. In contrast, certain embodiments of the present invention permit a user to access RSS content without the need for his own RSS reader. Further, embodiments of the present invention only require that system 30 access each RSS feed, as opposed to each system 30 user computer 20 wishing to access the RSS feeds, leading to substantial savings in network resources. Further, certain embodiments of the present invention allow user to access and compare content available via RSS feeds they are not even aware of, e.g., by their interaction with webpage 200 as discussed above, where webpage 200 includes content added using the methodology of process 800, for example. Accordingly, certain embodiments of the present invention provide for enhanced content syndication and aggregation, as compared to even RSS feeds themselves, for example. And, certain embodiments of the present invention provide for automatic aggregation of RSS fed content in combination with non-RSS fed content in a single application independent of any user RSS reader application.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A method for providing content from a server via a computer network and a computing device, the server being configured to access stored content data for a plurality of audio/visual presentations and identifying data associated with the stored content data for the plurality of audio/visual presentations, the method comprising:

receiving, at the server, a request by a user to host an audio presentation via the computer network from the computing device of the user;

receiving, at the server, identifying data associated with the hosted audio presentation via the computer network from the computing device of the user;

storing the received identifying data associated with the hosted audio presentation;

initiating, by the server, at least one telephone call independently of the computing device based on the stored identifying data associated with the hosted audio presentation, so that the server at least makes a telephone call to the user;

recording audio content of the at least one telephone call to form content data of a recorded telephone call;

storing the content data of the recorded telephone call so as to be associated with the stored identifying data associated with the hosted audio presentation to form part of the stored content data for the plurality of audio/visual presentations; and presenting at least a portion of the stored identifying data associated with the stored plurality of audio/visual presentations for selection by the computing device;

wherein, selection of the stored identifying data associated with a particular one of the stored plurality of audio/visual presentations causes the stored content data of the selected audio/visual or audio presentation to be provided to the computing device via the computer network for playback by the computing device.

2. The method of claim 1, further comprising:

storing identifying data associated with a second plurality of audio/visual presentations, without storing content data of the second plurality of audio/visual presentations;

wherein the presenting of the at least a portion of the stored identifying data associated with the stored plurality of audio/visual presentations comprises presenting at least a portion of the stored identifying data associated with the second plurality of audio/visual presentations for selection by the computing device.

3. The method of claim 2, further comprising:

storing identifying data associated with a plurality of feeds, wherein each of the feeds provides access to a corresponding plurality of audio/visual presentations which are accessible via the computer network, without storing content data of the provided audio/visual presentations; and periodically accessing each of the feeds to retrieve identifying data associated with the provided audio/visual presentations;

wherein the presenting of the at least a portion of the stored identifying data associated with the stored plurality of audio/visual presentations comprises presenting at least a portion of the stored identifying data associated with the provided audio/visual presentations for selection by the computing device.

4. The method of claim 3, further comprising aggregating the identifying data of the stored plurality of audio/visual presentations, the identifying data of the second plurality of audio/visual presentations, and the identifying data of the plurality of of audio/visual presentations provided by the feeds.

5. The method of claim 3, wherein the identifying data of the stored plurality of audio/visual presentations, the identifying data of the second plurality of audio/visual presentations, and the identifying data of the plurality of audio/visual presentations provided by the feeds are presented for selection using a common webpage.

6. The method of claim 1, wherein the network comprises at least one proprietary network connection and at least one connection via the Internet.

7. The method of claim 1, wherein the method includes:
initiating, by the server, a plurality of telephone calls independently of the computing device based on the stored identifying data associated with the hosted audio presentation; and
conferencing the plurality of telephone calls together,
wherein the content data of the recorded telephone call comprises audio content of the conferenced plurality of telephone calls.

8. The method of claim 1, further comprising validating at least a portion of the received identifying data prior to storage.

9. The method of claim 1, further comprising:
storing identifying data associated with a plurality of feeds, wherein each of the feeds provides access to a corresponding plurality of audio/visual presentations which are accessible via the computer network, without storing content data of the provided audio/visual presentations; and
periodically accessing each of the feeds to retrieve identifying data associated with the provided audio/visual presentations;
wherein the presenting of the at least a portion of the stored identifying data associated with the stored plurality of audio/visual presentations comprises presenting at least a portion of the stored identifying data associated with the provided audio/visual presentations for selection by the computing device.

10. The method of claim 1, wherein the identifying data associated with the hosted audio presentation comprises a telephone number of the user.

11. The method of claim 10, wherein the identifying data associated with the hosted audio presentation comprises a description of the hosted audio presentation.

\* \* \* \* \*